United States Patent [19]

Simmons et al.

[11] E Re. 30,225

[45] Reissued Mar. 11, 1980

[54] METHOD AND APPARATUS FOR FEEDING GRANULATED MATERIAL

[75] Inventors: John H. Simmons, Lyndhurst; Donald A. Daugherty, Euclid, both of Ohio

[73] Assignee: Precision Metalsmiths, Inc., Cleveland, Ohio

[21] Appl. No.: 884,264

[22] Filed: Mar. 6, 1978

Related U.S. Patent Documents

Reissue of:

[64] Patent No.: 4,016,922
Issued: Apr. 12, 1977
Appl. No.: 672,524
Filed: Mar. 31, 1976

[51] Int. Cl.[2] ..... B29F 1/06

[52] U.S. Cl. ..... 164/45; 425/256; 425/444; 425/448; 425/551; 425/572; 425/586

[58] Field of Search ..... 425/317, 447, 448, 449, 425/444, 803, 376, 551, 572, 586; 164/45, 154, 159

[56] References Cited

U.S. PATENT DOCUMENTS

| | | | |
|---|---|---|---|
| Re. 28,721 | 2/1976 | Farrell | 425/555 |
| 2,358,956 | 9/1944 | Ashbaugh | 425/448 X |
| 2,461,723 | 2/1949 | Cowan | 425/555 X |
| 2,523,137 | 9/1950 | Nichols et al. | 425/158 |
| 2,658,237 | 11/1953 | Cuppett et al. | 425/572 X |
| 2,758,338 | 8/1956 | Lynn | 425/307 |
| 3,004,290 | 10/1961 | Toulmin, Jr. | 425/547 X |
| 3,162,704 | 12/1964 | Attanasio et al. | 425/143 X |
| 3,217,364 | 11/1965 | Genest | 425/145 |
| 3,278,992 | 10/1966 | Strauss | 425/544 X |
| 3,729,176 | 4/1973 | Reich et al. | 222/195 X |

*Primary Examiner*—Robert L. Spicer, Jr.
*Attorney, Agent, or Firm*—Watts, Hoffmann, Fisher & Heinke Co.

[57] ABSTRACT

Method and apparatus are disclosed for cyclically metering charges of a granulated wax-like or resinous material from a bulk supply and feeding such metered charges into a heated, pressurized reservoir. Each charge of the granulated material is fluidized with a stream of air under pressure to insure flow of the granules. The stream of air also serves to pressurize the reservoir and prevent the escape of hot air therefrom. Cooling of the reservoir inlet to prevent agglutination of the granules also is contemplated.

9 Claims, 6 Drawing Figures

METHOD AND APPARATUS FOR FEEDING GRANULATED MATERIAL

Matter enclosed in heavy brackets [ ] appears in the original patent but forms no part of this reissue specification; matter printed in italics indicates the additions made by reissue.

BACKGROUND OF THE INVENTION

This invention relates generally to methods and apparatus for feeding granulated material, and more specifically to a method and apparatus for cyclically metering and feeding charges of meltable granulated material to a heated reservoir that is particularly adapted for use in conjunction with an injection apparatus for molding investment casting patterns.

Injection apparatus of a type adapted automatically to inject wax blends in the production of investment casting patterns is disclosed in U.S. Pat. No. 3,806,875 issued Apr. 23, 1974. The apparatus includes a relatively large, heated, pressurized reservoir for receiving and maintaining molten a quantity of the wax-like or resinous material to be injected. It was the practice to fill the reservoir once or twice daily with relatively large quantities of the molten wax material which was melted elsewhere before being transported to the heated reservoir. The practice of pre-melting the injection material necessitated an extra operation and required additional heating equipment. It also presented certain difficulties in handling the molten material being transported and maintaining the material in the molten condition. A relatively large amount of the molten material must be stored in the reservoir until ready to be used. To maintain such a quantity of material in the molten condition necessitates the expenditure of relatively large amounts of heat energy.

SUMMARY OF THE INVENTION

An object of the present invention is to provide a method and apparatus for feeding granulated material into a heated tank for melting the material and supplying it to an injection molding machine.

Another object of the invention is to provide a method and apparatus for automatically feeding measured charges of granulated material into a heated tank in response to the quantities of melted material periodically supplied to an operatively connected injection molding machine, whereby a relatively constant level of melted material is maintained in the reservoir.

A further object of the invention is to provide a method and apparatus as described above which are further characterized in that each measured charge of material is fluidized with air or other gas under pressure in order to prevent agglutination of the particles.

Still another object of the invention is to provide a method and apparatus for feeding granulated wax-like injection molding material to a pressurized heated tank connected to an injection molding machine characterized by the operation and steps of separating relatively small quantities of granulated material from a bulk supply thereof; fluidizing the relatively small quantities with air under pressure to prevent agglutination of the granules; metering a charge of predetermined size from each fluidized quantity; depositing each such metered charge in the tank in response to molten material extracted from the tank by the injection molding machine; and admitting the pressurized air into the tank with each measured charge in order to assist in charge deposition in the tank, to pressurize the tank, and to prevent the escape of heated air therefrom.

In a preferred embodiment, the feeding apparatus of the invention comprises a housing having an inlet port communicating with a supply of wax-like granular material and an outlet port communicating with a pressurized tank adapted to melt the material and supply the melt to an injection molding machine, a transfer member which defines a metering chamber adjustably movable in the housing between the inlet and outlet ports for receiving a quantity of granular material and metering a measured charge of such material into the tank, and means for pressurizing the metering chamber in order to fluidize and prevent agglutination of the wax-like particles.

When the transfer member is moved to place the metering chamber in communication with the inlet port, compressed air or other gas within the metering chamber is released therefrom and acts to fluidize the stream of incoming granules and prevent any bridging of the particles as would prevent them from flowing freely into the metering chamber. When the transfer member is moved to place the metering chamber in communication with the outlet port, compressed air flows into the tank to facilitate the flow of the particles out of the chamber and through a delivery tube into the tank. The compressed air flow into the tank also minimizes the tendency of hot air to escape from the tank into the metering chamber to cause the wax-like granules to soften and stick together so that they do not flow properly. The compressed air supplied to the feeder apparatus also may be used to pressurize the heated tank.

The size of the charge released from the metering chamber into the tank can be selectively controlled. In the preferred embodiment of the invention, the transfer member is automatically operated in response to cycling movement of dies of the associated injection machine. A fresh metered charge of granular material is admitted to the tank each time the dies are opened. By controlling the size of the metered charges, in correspondence to the amounts of molten material withdrawn from the tank each time the dies are closed, it is possible, to maintain a nearly constant level of melted material in the tank.

Other objects and advantages and a fuller understanding of the invention will be had from the following detailed description of a preferred embodiment and the accompanying drawings.

DESCRIPTION OF THE PREFERRED EMBODIMENT

Figure 1:
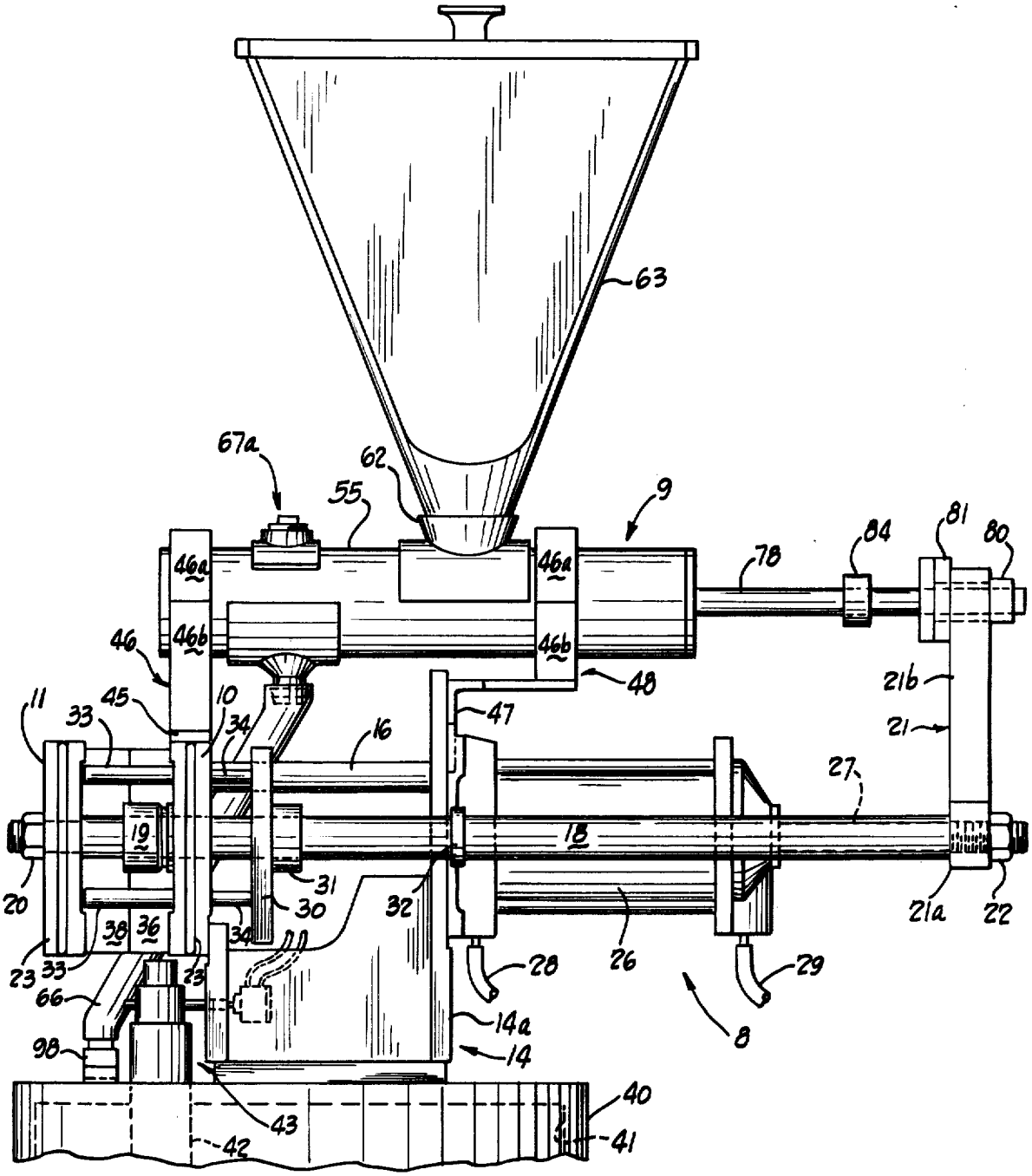
FIG. 1 is a fragmentary elevational view of an assembly of an injection machine and a feeder apparatus embodying the present invention.
Figure 2:
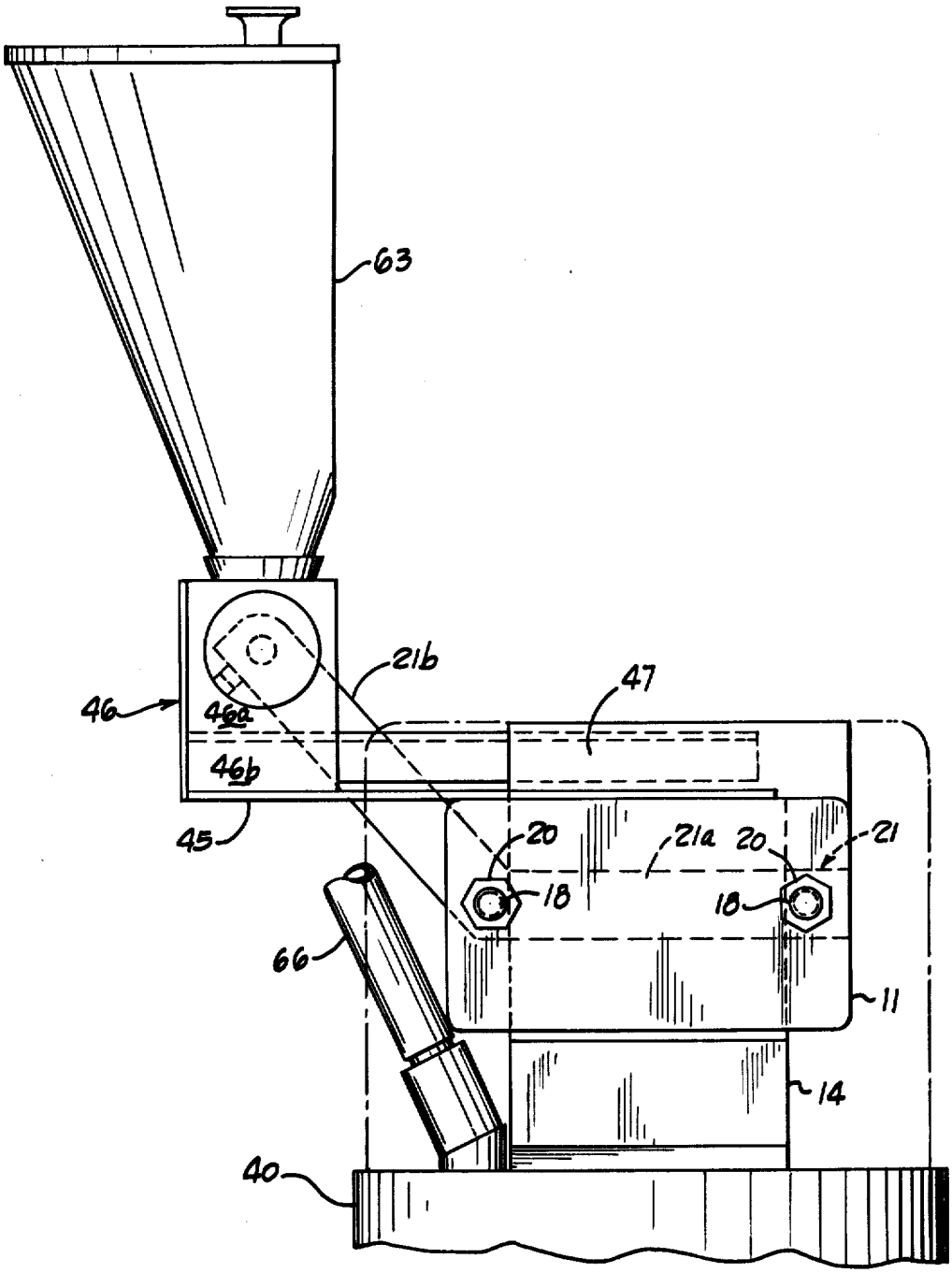
FIG. 2 is an end elevational view of the assembly of FIG. 1.
Figure 3:
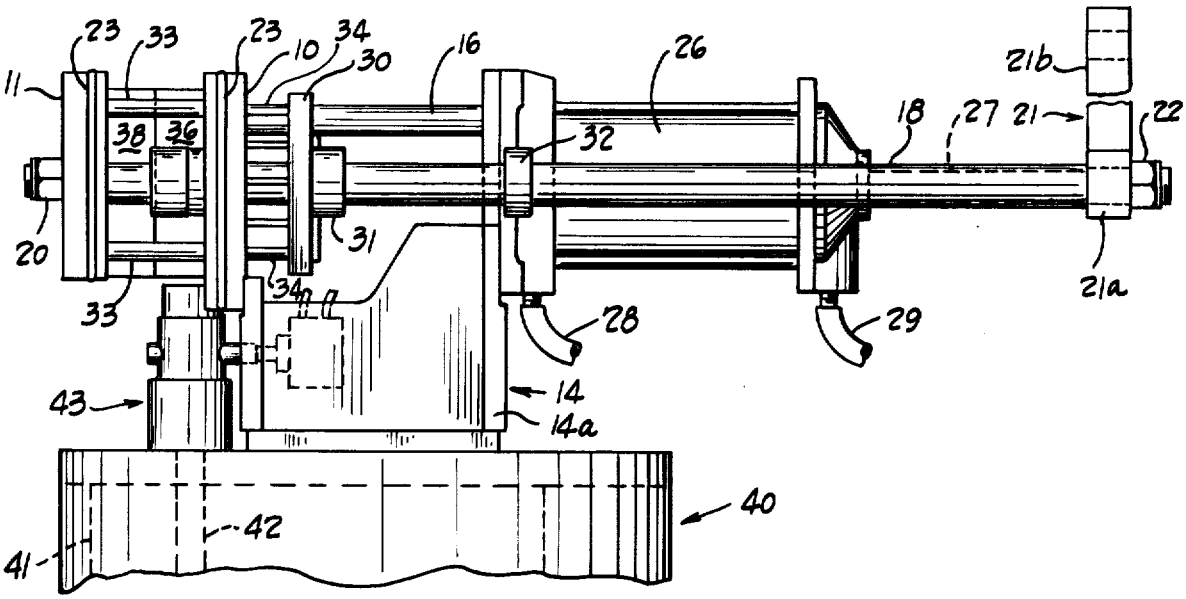
FIG. 3 is a fragmentary elevational view of a portion of the assembly shown in FIG. 1.
Figure 4:
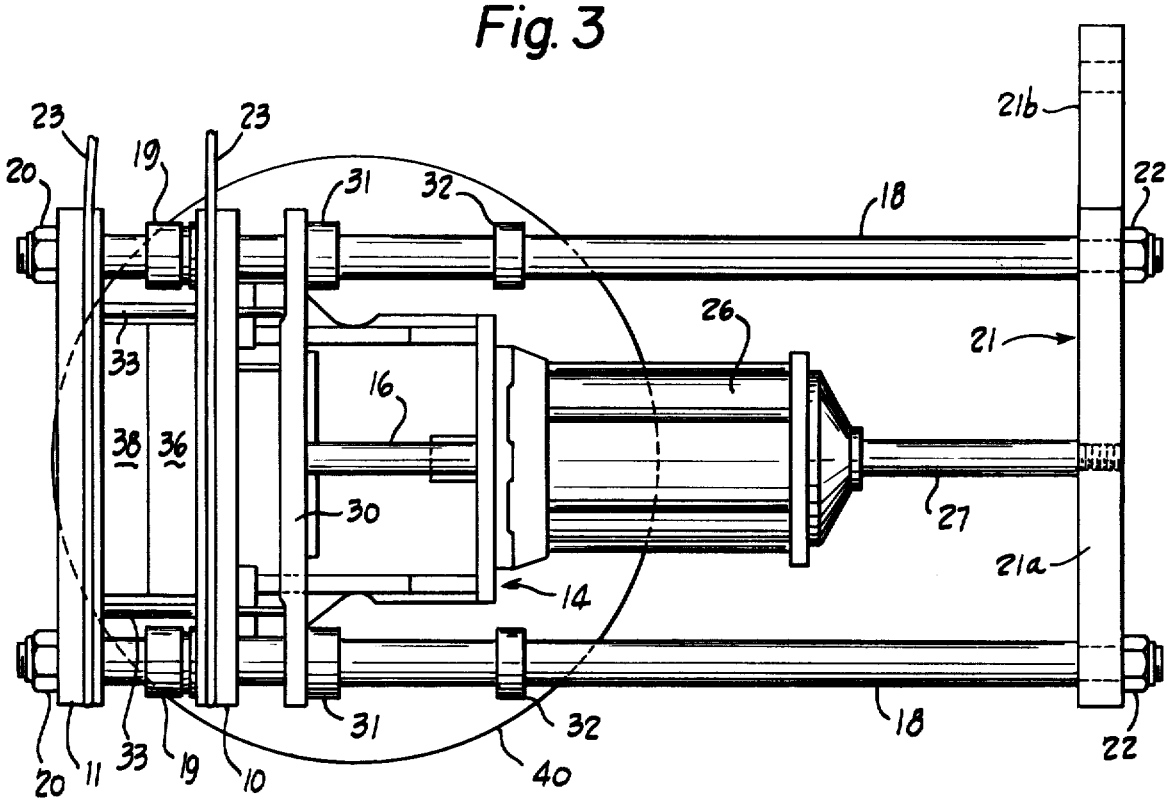
FIG. 4 is a plan view of the apparatus illustrated in FIG. 3.

Referring to the drawings and particularly to FIGS. 1 and 2, an assembly is shown which comprises an injection machine 8 operatively connected to a feeder apparatus 9 embodying the present invention. The injection machine 8, illustrated without the feeder apparatus in FIGS. 3, 4, generally comprises a fixed platen 10 and a movable platen 11. The fixed platen 10 is connected to a support bracket 14. A post 16 has one end welded to the bracket 14 and its other end secured to the platen 10. A pair of guide posts 18 slidably extend through the platen 10 in bushings 19. Each of the posts 18 has one of its ends secured to the platen 11 by a nut 20 and its other end secured to the horizontal leg 21a of an offset pusher bracket 21 by a nut 22. Cooling coils 23, through which water is adapted to be circulated, are disposed around the platens 10, 11.

The assembly comprising the movable platen 11, the posts 18 and pusher bracket 21 is reciprocated by actuation of a double-acting air cylinder 26 which is secured to the bracket 14. The piston rod 27 of the cylinder 26 has its free end connected to the horizontal leg 21a of the pusher bracket 21. Air is selectively admitted to the air cylinder 26 through the conduits 28, 29. When air is admitted to the cylinder mechanism through the conduit 28, the piston rod 27 is extended to draw the movable platen 11 toward the fixed platen 10. When air is admitted to the cylinder 26 through the conduit 29, the piston rod 27 is retracted to move the platen 11 away from the platen 10.

An ejector plate 30 located behind the platen 10 is slidably supported on the posts 18 by flange bearings 31. A collar 32 is fixed on each of the posts so that when the air cylinder 26 is actuated to separate platen 11 from platen 10, the collars 32 will engage the flange bearings 31 to move the ejector plate 30 toward the fixed platen 10. Ejector posts 33 slidably extend through the fixed platen 10 and have their ends engageable with the movable platen 11 and the ejector plate 30. When the platen 10 is moved toward the platen 10 by actuation of the cylinder 26, the ejector plate 30 is pushed away from the platen 10 by the posts 33. Each ejector post 33 has an intermediate shoulder portion 34 which serves to limit rearward movement of the post through the fixed platen 10.

A die assembly of the injection machine 8 comprises a die member 36 carried on the platen 10 and a mating die member 38 carried on the platen 11. Molten injection material is supplied to the die assembly via a runner block assembly (not shown) from a reservoir 40. The reservoir 40 includes a heated tank 41 which is adapted to be pressurized in a manner to be described to force molten material out of the tank through an outlet tube assembly 42. A nozzle assembly 43 disposed atop the reservoir 40 interconnects the outlet tube assembly 42 and the above-mentioned runner block assembly. The nozzle assembly 43 permits the flow of molten material between the tank 41 and the runner block assembly for subsequent passage into the die assembly when the die members 36, 38 are in their closed position.

The above-described apparatus and its operation is more completely disclosed in U.S. Pat. No. 3,805,875. The disclosure of that patent is incorporated herein by reference.

The manner in which the feeder apparatus 9 is mounted to the injection apparatus 8 is clearly illustrated in FIGS. 1, 2. The fixed platen 10 supports a front bracket 45 which comprises an elongate strip of rectangular cross section. A front, split block clamp 46 is supported atop the bracket 45. The front clamp 46 comprises upper and lower mating block members 46a, 46b which each have similar semicircular recesses therein. The blocks 46a, 46b are intended to be abutted with their recesses aligned to form a circular aperture dimensioned to peripherally engage and support the feeder apparatus 9 proximate one end thereof. Wall 14a of support bracket 14 mounts a rear bracket 47 which comprises an elongate member having a varying L-shaped cross section which varies in dimension along the length of the member. The rear bracket 47 supports a rear clamp 48 having upper and lower mating block members 48a, 48b which each include a semicircular recess therein. The block members 48a, and 48b may also be butted so the semicircular recess align to form a circular aperture dimensioned to peripherally engage and support the feeder apparatus 9 proximate the other end thereof.

Figure 5:
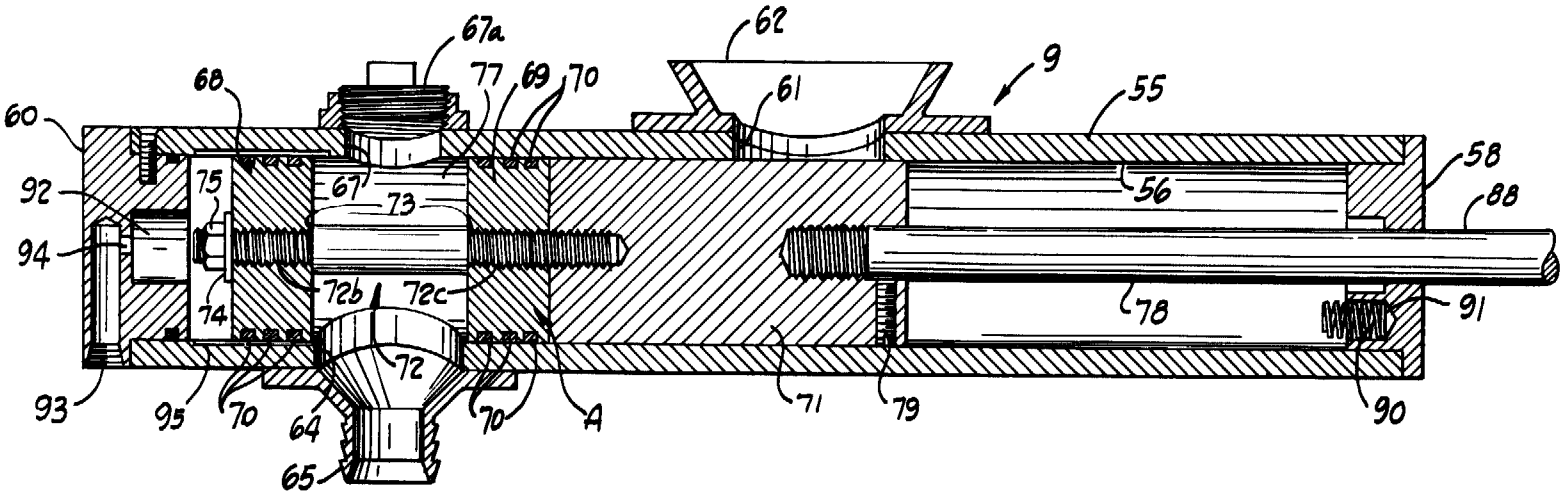
FIG. 5 is a cross-sectional view of the feeder apparatus of the present invention.
Figure 6:
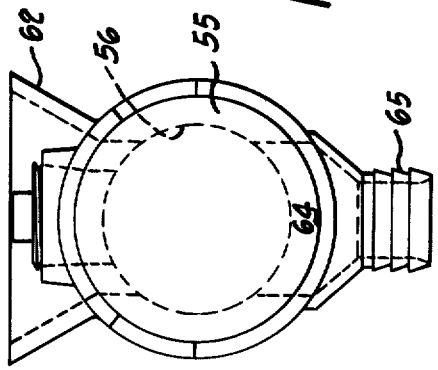
FIG. 6 is an end view of the feeder apparatus illustrated in FIG. 5.

Referring to FIG. 5, the feeder apparatus 9 embodying the present invention is shown in detail. The feeder apparatus 9 comprises generally a tubular housing 55 having a cylindrical interior passage 56. A pair of end caps 58 and 60 are attached to the housing 55 at its opposite ends to limit access to the passage 56. An inlet port 61, an outlet port 64 and a cleanout port 67 in the housing wall communicate with the passage 56.

The inlet port 61 is located approximately midway along the length of the housing 55. A funnel holder 62 is secured to the housing 55 in communication with the inlet port 61 and is adapted to support a funnel-like hopper 63 (FIGS. 1, 2) which contains a bulk quantity of granulated wax-like or resinous material.

The outlet port 64 is located near one end of the housing 55 adjacent the end cap 60. A discharge nozzle 65 connected to the housing 55 in communication with the outlet port 64 is adapted to support a conduit 66 (FIGS. 1, 2) which communicates with the tank 41 containing the molten injection material. The cleanout port 67 is provided to give access to the interior of the housing 55 adjacent the outlet port 64 and is closed by removable plug 67a.

A transfer member comprising a piston assembly for receiving granular material introduced into the housing 55 through the inlet port 61 and transferring the material to the outlet port 64 is generally designated by reference letter A. The piston assembly comprises a pair of spaced apart pistons 68, 69, each of which may be provided with conventional piston rings 70, and a shut-off plug 71. This piston 68, 69 and the shut-off plug 71 are secured together by a connecting rod 72. The rod 72 has a central portion 72a and threaded end portions 72b, c. The central piston 72a is larger in diameter than the threaded end portions so as to define shoulders 73 therebetween. The connecting rod end portion 72b extends through the piston 68 and receives a washer 74 and a threadedly engaged hex nut 75 which serve to retain piston 68 against its respective shoulder 73. The connecting rod end portion 72c extends through the piston 69, and is threaded into the plug 71 to retain the piston 69 against its respective shoulder 73.

The spaced pistons 68, 69 define a metering chamber 77 in the interior passage 56. The piston assembly A is reciprocated within the passage 56 so that the metering chamber 77 alternately communicates with the inlet port 61 and the outlet port 64. When the metering chamber 77 is located at the inlet port 61, granulated material from the bulk supply is permitted to flow into and fill the chamber 77. As the chamber 77 is moved to the outlet port 64, initially the piston 69 and subsequently the shut-off plug 71 move into blocking engagement with the inlet port 61 to prevent granulated material therein from entering the interior passage 56. When metering chamber 77 reaches the outlet port 64, a metered quantity of granular material is discharged through the outlet port.

The piston assembly A is reciprocated by actuation of a driving rod 78 which has one end threadedly inserted in the shut-off plug 71 and locked in place at that end by a set screw 79. The driving rod extends through the end cap 58 and is operably connected at its other end to the offset leg 21b of the pusher bracket 21 so that each time the air cylinder 26 is activated and its piston rod 27 is either extended or retracted, a motion is transmitted to the piston assembly A. When the platen 11 is moved toward the platen 10 to close the dies 36, 38, the piston rod 27 is extended and that extending motion is transmitted to the driving rod 78 to cause the metering chamber 77 to move out of communication with the outlet port 64 and into a communication with the inlet port 61. When the piston 27 is retracted to open the dies 36, 38, the piston assembly A is actuated to move the metering chamber 77 from the inlet port 61 to the outlet port 64. A damping spring 90 is mounted in a recess 91 formed in the inner face of the end cap 58. The spring 90 acts to cushion movement of piston assembly A toward the end cap 58.

In the preferred embodiment of the present invention, the size of the granular charge which is discharged into the tank 41 is controlled by adjusting the extent to which the metering chamber 77 is allowed to extend over the outlet port 64. This adjustment is provided by a lost motion mechanism employed with the pusher bracket 21 operably connecting the piston rod 27 and the driving rod 78. As shown in FIG. 1, a nut or stop member 80 is fixed to the free end of the driving rod 78. The offset leg 21b of the pusher bracket 21 is slidable on the rod 78 between the stop member 80 and an adjustment nut assembly 81. The nut assembly 81 can be adjusted along the length of the rod 78 between the stop member 80 and a spaced stop 84 mounted on the rod 78 inboard of the member 81.

When the adjustment nut assembly 81 is adjusted to the position shown in FIG. 1 in which the leg 21b is clamped against the end stop 80, the rod 78 moves with the piston rod 27 through its full range of travel so that the metering chamber 77 is fully open to the outlet port 64, as shown in FIG. 5, when the piston rod 27 has been actuated to open the injection dies 36, 38. The extent to which the metering chamber 77 overlaps the outlet port 64 and, hence, the size of the charge released from the chamber when the injection dies 36, 38 are opened can be diminished by adjusting the nut assembly 81 away from the stop 80 toward the stop 84. Such adjustment permits the pusher bracket leg 21b to move relative to the rod 78 as the dies 36, 38 are opened until the leg engages the nut assembly 81.

According to the preferred embodiment of the invention, the housing 55 is supplied with compressed air in order to fluidize the particulate injection material in the metering chamber 77 and to pressurize the tank 40. As illustrated in FIG. 5, the compressed air is communicated from an external source (not shown) to the housing 55 via the end cap 60. The end cap 60 has a recess 92 in its inner surface and an inlet passage 93 that communicates with the recess 92 through an opening 94.

The outlet port 64 is in open communication with the compressed air supplied to the interior passage 56 of the housing 55. When the piston assembly A is in the position shown in FIG. 5, the compressed air in the passage 56 is admitted to the metering chamber 77 through bleed grooves 95 formed in the inside surface of the housing 55 to provide a flow path past the piston 68. The compressed air exits the metering chamber 77 through the outlet port 64 into the tank 41.

The compressed air admitted to the metering chamber 77 as described above serves to fluidize the granular wax-like material contained therein and thus insure that the material will flow freely through the outlet port 64 without sticking. The compressed air which exits the chamber 77 through the outlet port 64 along with the metered granular charge also serves to pressurize the tank 41 and to act as a thermal barrier between the tank 41 and the feeding apparatus 9, whereby heat generated in the tank will be generally contained therein. Thus, heat will not pass upward from the tank into the feeding apparatus to prematurely heat and either melt or cause agglutination of the metered granules so as to inhibit their flow into the tank.

In order to further guard against agglutination of the metered granular charge at the entrance to the tank 41 from the conduit 66, an inlet 98 (FIG. 1) disposed at the tank entrance may be water cooled by the cooling system 23 which cools the platens 10, 11.

When the piston assembly A is actuated to move the metering chamber 77 away from the outlet port 64, a quantity of compressed air is sealed in the chamber and subsequently released through the inlet port 61. The air which is released through the inlet port fluidizes the incoming material and prevents the wax-like granules from bridging across the inlet so as to inhibit their flow into the metering chamber.

The operation of the apparatus of the invention will be largely apparent from the foregoing description. In summary, the piston assembly A is actuated by extension of the piston rod 27 and closing movement of the injection dies to a first position on which the metering chamber 77 is below the inlet port 61. The wax-like granules from the hopper 63 flow through the inlet port into the chamber 77 and are fluidized by escaping pressurized air to prevent bridging, etc. After the adjustment nut assembly 81 has been positioned to control the amount of the charge released from the metering chamber, the piston assembly A is actuated by retraction of the piston rod 27 and opening movement of the injection dies to its second position in which the metering chamber 77 is in communication with the outlet port 64. In this position, compressed air flows through the metering chamber 77 to assist in discharging at least a portion of the granules in the chamber 77.

It will be aparent that the invention achieves the objectives of providing an apparatus for automatically feeding solid granules of wax or similar materials to a heated reservoir tank of an injection machine where the material is melted and then supplied to the injection dies. In the preferred embodiment that has been described, the material is supplied to the tank in charges of regulated size which approximately equal the amount injected into the dies on each shot, whereby the apparatus remains nearly in balance.

Many modifications and variations of the invention will be apparent to those skilled in the art in light of the foregoing description. Therefore, it is to be understood that, within the scope of the appended claims the invention can be practiced otherwise than as specifically disclosed.

What is claimed is:

1. In [an] *apparatus for* injection [apparatus] *molding thermoplastic material* having a pair of relatively movable dies, [means including] a pressurized heated tank for supplying molten *thermoplastic* injection material to the dies, [and] means for causing relative movement of the dies between open and closed positions, *and injection means for transferring molten thermoplastic material from the tank to the dies when in closed position* the improvement [of a feeder for periodically supplying charges of solid granules of injection material to said tank, said feeder] comprising:

a. [A] *a* housing having an inlet port [and] *adapted to be connected to a supply of granular thermoplastic material,* an outlet port [communicating] *adapted to be connected* with [said] *the* tank, *and a pressure port spaced from said outlet port;* b. *transfer* means [containing a supply of granules communicating with said inlet port] *in said housing;* c. *said* transfer means [including a metering chamber] *being* movable [in said housing] between:

*(i)* a first position in which said [chamber receives a quantity of granules] *transfer means can receive granular thermoplastic material* admitted through said inlet port; and

*(ii)* a second position in which said [chamber discharges a charge of granules] *transfer means can discharge granular thermoplastic material* through said outlet port *into the tank;* d. means for actuating said transfer means, and e. [means for pressurizing] *said pressure port communicating with said outlet port when said transfer means is in said first and second positions* via said [metering chamber to fluidize the granules of injection material contained therein when said transfer means is in said second position] *transfer means, whereby discharge of granular thermoplastic material from the transfer means can be assisted by pressurized gas and pressurized gas is trapped in said transfer means and released through said inlet port when said transfer means is moved to said first position to assist the flow of granular thermoplastic material into said transfer means and whereby the tank is pressurized with gas admitted thereto through said outlet port.*

2. The improvement as claimed in claim 1 wherein when said transfer means is in its second position, a portion of said transfer means closes said inlet port.

3. The improvement as claimed in claim 1 wherein said means for actuating said transfer means is *adapted to be* operatively connected to said die moving means, whereby a charge of granules is supplied to said tank in response to movement of said dies.

4. The improvement as claimed in claim 3 wherein [an] *each* amount of molten [injection] material [is] withdrawn from the tank and injected into the dies in their closed position[, and wherein each amount of molten material withdrawn from the tank] approximately equals the size of each granular charge supplied to the tank.

[5. In an injection apparatus having a pair of relatively movable dies, means for causing relative movement of the dies between open and closed position, and means including a pressurized heated tank for supplying molten injection material to the dies in their closed position, the improvement of a feeder for periodically supplying charges of solid granules of injection material to said tank, said feeder comprising:

a. a housing having an inlet port and an outlet port communicating with said tank, b. means containing a supply of granules communicating with said inlet port, c. transfer means including a metering chamber movable in said housing between a first position in which said chamber receives a quantity of granules admitted through said inlet port and a second position in which said chamber discharges a charge of granules through said outlet port, d. means for actuating said transfer means, and e. means for supplying gas under pressure to said metering chamber and to said inlet and outlet ports within said housing.]

[6. The improvement as claimed in claim 5 wherein when said transfer means is in its second position, a portion of said transfer means closes said inlet port.]

[7. The improvement as claimed in claim 5 wherein said pressurized gas supplied to the outlet port is admitted to said tank to pressurize it.]

8. The improvement as claimed in claim [5] *1* including means for selectively changing said second position of said transfer means in order to [measure] *change* the [charges] *amount* of [granules] *granular thermoplastic material* discharged from said [metering chamber] *transfer means* through said outlet port.

[9. In an injection apparatus having a pair of relatively movable dies, means including a pressurized heated tank for supplying molten injection material to the dies, and means for causing relative movement of the dies between open and closed positions, the improvement of a feeder for periodically supplying measured charges of solid granules of injection material to said tank, said feeder comprising:

a. a housing having inlet and outlet ports, said outlet port communicating with said tank, b. means containing a supply of granules communicating with said inlet port, c. transfer means in said housing having a metering chamber, d. said transfer means being movable between a first position in which said chamber is disposed in communicating with said inlet port to receive a quantity of granules and a variable second position in which at least part of said chamber overlaps said outlet port, e. means for varying said second position of said transfer member in order to selectively measure the charge of granules metered from said chamber through said outlet port, and f. means for actuating said transfer member between said first and second positions.]

[10. The improvement as claimed in claim 9 including means for supplying gas under pressure to said metering chamber and permitting the gas to be communicated to said inlet and outlet ports via said chamber when said transfer means is in said first and second positions, respectively.]

11. In an injection apparatus having a pair of relatively movable dies, means for causing relative movement of the dies between open and closed positions, and a pressurized heated tank for supplying molten injection material to the dies in their closed position, the method of feeding granulated wax-like injection molding material to the tank for melting and subsequent injection comprising:

a. separating relatively small quantities of the granulated material from a bulk supply thereof;

b. fluidizing the relatively small quantities with [air] *gas* under pressure *from a source independent of the tank* to prevent agglutination of the granules;

c. metering a charge of predetermined size from each fluidized quantity; and d. depositing each such metered charge in the tank.

12. The method of claim 11 and further comprising the step of depositing each such metered charge in the tank in response to withdrawal of molten injection material from the tank by the injection apparatus for [injecion] *injection* into the dies in their closed position.

13. The method of claim 11 and further comprising the step of admitting pressurized [air] *gas* into the tank with each metered charge.

*14. A method of feeding granular thermoplastic material comprising the steps of:*

*a. introducing material into a transfer means through an inlet port,*

*b. moving said material to an outlet port,*

*c. discharging at least part of said material from said transfer means through the outlet port, and*

*d. introducing pressurized gas into said transfer means through a pressure port spaced from said outlet port to assist in discharging said material from said transfer means.*

* * * * *